United States Patent

[11] 3,533,389

[72] Inventor Robert G. Harker
P. O. Box 75, Verdi, Nevada 89439
[21] Appl. No. 786,601
[22] Filed Dec. 24, 1968
[45] Patented Oct. 13, 1970

[54] MOTORCYCLE POWER STARTER
5 Claims, 3 Drawing Figs.
[52] U.S. Cl. .................................................. 123/179,
123/185
[51] Int. Cl. ........................................ F02n 13/02
[50] Field of Search ........................................ 123/179(C),
179(F), 179(O), 179(CC), 179(P), 185(B), 185,
185(C-1), 185(D)

[56] References Cited
UNITED STATES PATENTS
2,625,923   1/1953   King ............................. 123/179

Primary Examiner—Laurence M. Goodridge
Attorney—Jones and Lockwood

ABSTRACT: There is an arm pivotally connected to an internal combustion starting mechanism. This arm has a retractable pedal against which the foot is placed to kick down the arm in an arcuate path to start the internal combustion engine such as a motorcycle. A fluid pressure mechanism is provided to force the starter arm through this arcuate path. A cylinder and piston is pivotally attached to the frame of the motorcycle or internal combustion engine frame above the kick down arm. The piston rod is pivotally attached to the kick arm of the starter. A fluid pressure supply cylinder suitably mounted furnishes the fluid pressure. A pressure regulator valve and gauge is attached to the fluid pressure cylinder and pressure is supplied through it and a conduit to a control valve mounted on the frame and having a pressure supply conduit attached to the cylinder of the piston and cylinder. The control valve has a spring retracted actuator and on pushing down on the actuator passageways are aligned to supply fluid pressure to the cylinder to force the piston. On release of the actuator passageways are brought into alignment which vent the cylinder to the atmosphere as the piston in the cylinder returns under spring pressure to its upper position.

Patented Oct. 13, 1970 3,533,389
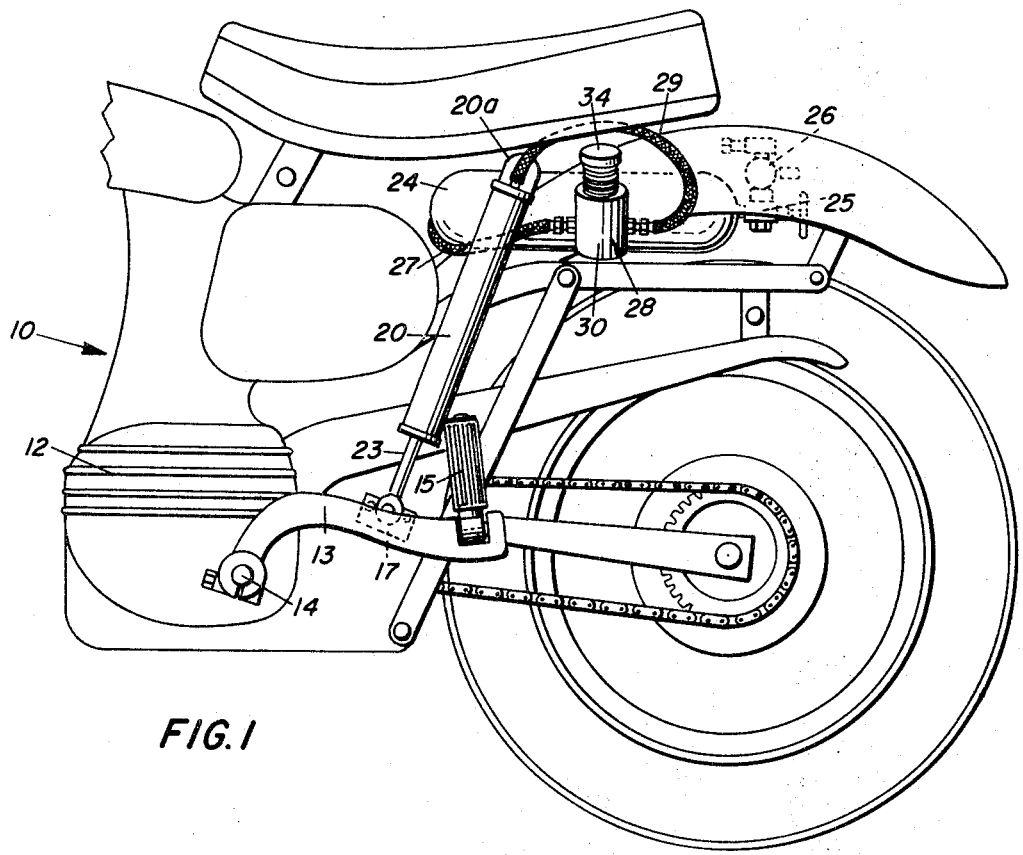
FIG.1
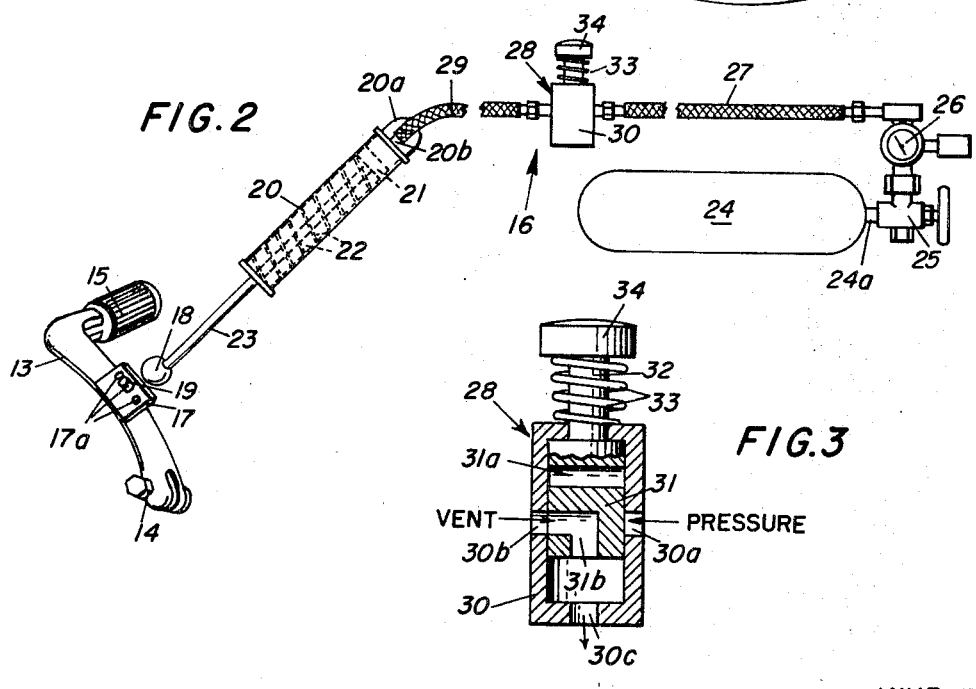
FIG.2
FIG.3
INVENTOR
ROBERT G. HARKER
BY Beale and Jones
ATTORNEYS

MOTORCYCLE POWER STARTER

It is an object of my invention to provide an actuating apparatus for attachment to a motorcycle and the kick starter arm thereof to provide for moving the kick arm and pedal starter to start the engine of the motorcycle.

For a more complete understanding of the apparatus structure and operation, reference is made to the drawings and the description which follows. In the drawings:

FIG. 1 is a partial side elevation of a motorcycle having the starter apparatus attached;

FIG. 2 is a side elevational view of the starter apparatus detached from the motorcycle; and FIG. 3 is a partial cross-sectional view of the push button starter and vent to atmosphere valve.

Throughout the description, like reference numerals refer to similar parts.

A motorcycle is generally indicated at 10. It has an internal combustion engine 12 and a kick starter arm 13 pivotally attached at its lower end to the cross shaft 14 on the engine 12. It has a retracting pedal 15 at its upper end.

The starter apparatus is generally indicated at 16 in FIG. 2. It has a plate 17 welded to the arm 12 and there are three spaced attachment holes 17a through the plate for attachment of a universal joint assembly 18. The assembly 18 is attached to plate 17 by a bolt 19. A power cylinder 20 has a piston 21 therewithin which acts downward against a compression spring 22 through which the piston rod 23 passes downward where it is connected at its lower end to the universal joint 18. A bracket 20a at the top of the power cylinder has an aperture therethrough by which it is pivotally attached to the frame of the motorcycle 10.

A cylinder of compressed air or $CO_2$ or the like 24 is mounted on the frame of the motorcycle by suitable brackets (not shown). There is a pressure regulator valve 25 attached to the pressure cylinder 24 having common charge and discharge fitting 24a. The valve 25 has an adjustment hand wheel and a pressure gauge 26. A high pressure conduit 27 leads from the valve 25 to a push button starter and vent valve 28. Another high pressure conduit 29 leads from the discharge passage connection on valve 28 to the top end pressure fitting 20b on the top end of the power cylinder 20.

In FIG. 3 a cross section of the push button valve 28 is illustrated. It has a generally cylindrical housing with an entrance passage 30a in one wall portion and across from this an exit passage to the power cylinder and in the bottom a vent passage 30c to atmosphere. A piston 31 is received in the housing 30 and it has a rod 32 attached to its top that extends through the top of housing 30 through a compression spring 33 which presses against the cylinder 30 and a button or cap 34 secured to the top end of rod 32.

In the piston 31 there is a cross passage 31a which is aligned with passages 30a and 30b to permit pressure to be applied to the power cylinder. On release of the piston 31, the spring 33 pushes it up so that a passage 31b therein communicates with the passage 30b and the vent passage 30c to vent the power cylinder to atmosphere as the piston 21 and rod 23 return after a power stroke.

In operation the regular valve 25 is adjusted by the hand wheel 25a to the proper pressure as indicated by gauge 26. The ignition switch is turned on for the motorcycle engine and the spark and gas levers suitably adjusted. The push button valve 28 is actuated by pressure applied to push button 34 and the rod 32 to move it down while the spring 33 returns it to up position where venting to atmosphere takes place.

I claim:

1. An actuating apparatus for a pivotally mounted kick starter of an internal combustion engine having a mounting frame comprising:

an attachment means adapted to be secured to a pivot arm of a kick starter;

an elongated piston and cylinder assembly pivotally attached at one end to said attachment means on the pivot arm of the kick starter and at the other end pivotally attached to the mounting frame of the internal combustion engine;

a control valve means having an entrance passage, a vent passage to atmosphere and a discharge passage and a movable operating member having a passageway for alignment with said entrance and discharge passages and in another position aligning the discharge passage with the vent passage;

a fluid pressure cylinder adapted to be attached to the mounting frame of the engine and having a common filling and discharge connecting means;

a fluid pressure regulator valve means having a control valve and a pressure discharge indicator, said fluid pressure valve means being connected to said common discharge and filling connecting means on the fluid pressure cylinder; and conduit means connecting the regulator valve discharge to said cylinder of the piston and cylinder assembly, whereby the pressure regulator valve is adjusted to provide a pressure supply to said cylinder and piston assembly entrance passage and to the cylinder to move the piston therein when the movable operating member aligns the entrance and discharge passages and to vent said cylinder to atmosphere in another position of said movable operating member.

2. An actuating apparatus according to claim 1 wherein the cylinder end of the elongated piston and cylinder assembly is pivotally attached to said mounting frame of the internal combustion engine.

3. An actuating apparatus according to claim 1 wherein said elongated piston and cylinder assembly has a compression spring means acting against the piston thereof to return it to retract said piston rod on movement of the control valve means to vent position.

4. An actuating apparatus according to claim 1 wherein said movable operating member of the control valve is spring biased to align said discharge passage with said vent passage.

5. An actuating apparatus according to claim 1 wherein the cylinder end of the elongated piston and cylinder assembly is pivotally attached to said mounting frame of the internal combustion engine, said elongated piston and cylinder has a compression spring means acting against the piston thereof to return it to retract piston rod on movement of the control valve means to vent position and said movable operating member of the control valve is spring biased to align said discharge passage with said vent passage.